United States Patent [19]

Leca

[11] Patent Number: 4,956,224

[45] Date of Patent: Sep. 11, 1990

[54] ARTICLES PRODUCED FROM A LAMINATE AND PROCESS FOR THEIR MANUFACTURE

[75] Inventor: Jean-Paul Leca, Mantes la Jolie, France

[73] Assignee: Societe Chimique Des Charbonnages S.A., Paris, France

[21] Appl. No.: 72,975

[22] PCT Filed: Nov. 4, 1986

[86] PCT No.: PCT/FR86/00373

§ 371 Date: Sep. 3, 1987

§ 102(e) Date: Sep. 3, 1987

[87] PCT Pub. No.: WO87/02622

PCT Pub. Date: May 7, 1987

[30] Foreign Application Priority Data

Nov. 5, 1985 [FR] France ............... 85 16352

[51] Int. Cl.$^5$ .............................................. B32B 7/02
[52] U.S. Cl. ........................................ 428/213; 156/285;
264/510; 264/516; 264/547; 428/214
[58] Field of Search ............... 156/285; 264/510, 516,
264/547, 101, 511; 428/212–214

[56] References Cited

U.S. PATENT DOCUMENTS

| | | | |
|---|---|---|---|
| 3,896,069 | 7/1975 | Kosaka et al. | 260/28.5 AV |
| 4,443,507 | 4/1984 | Yamada et al. | 428/114 |
| 4,634,140 | 1/1987 | Stroi | 264/511 X |

FOREIGN PATENT DOCUMENTS

| | | |
|---|---|---|
| 1303490 | 6/1961 | France . |
| 2325505 | 9/1975 | France . |
| 2343580 | 3/1976 | France . |
| 1091678 | 11/1967 | United Kingdom . |
| 1210268 | 3/1968 | United Kingdom . |
| 1301023 | 1/1970 | United Kingdom . |
| 2043532A | 1/1979 | United Kingdom . |
| 2087307A | 10/1981 | United Kingdom . |

OTHER PUBLICATIONS

International Search Report, PCT/FR 86/00373, Feb. 19, 1987.

*Primary Examiner*—Michael Lusignan
*Attorney, Agent, or Firm*—Finnegan, Henderson, Farabow, Garrett & Dunner

[57] ABSTRACT

Article produced from a laminate comprising at least one thermoplastic resin layer (A), at least one fibre-reinforced heat-cured resin layer (B) and at least one adhesive layer (C) intermediate between layers (A) and (B).

It is of complex shape and the ratio of the thickness of layer (B) to the thickness of layer (A) in the said article is at least equal to 1.5.

The process of manufacture consists in that, in a first step, a thermoplastic resin layer (A) is coated hot with at least one adhesive layer (C) and then, in a second step, the said adhesive-coated layer (A) is subjected to a skeleton forming operation using a complex-shaped layer (B) of fibre-reinforced heat-cured resin as a forming mould, the skeleton forming conditions being such that the ratio of the thickness of layer (B) to the thickness of layer (A) in the complex-shaped article produced is at least equal to 1.5.

13 Claims, No Drawings

# ARTICLES PRODUCED FROM A LAMINATE AND PROCESS FOR THEIR MANUFACTURE

The assembly of one or more layers of thermoplastic resin with one or more layers of reinforced thermosetting resin to form a laminate material has always presented a technical problem which is difficult to solve.

One of the first proposed solutions consisted, according to GB Pat. No. 1,210,268 relating to coldformed laminates in which the thermoplastic layer consists of polyvinyl chloride or chlorinated polyethylene, in improving the adhesion of this layer to the thermosetting layer occasionally reinforced with fibres by carrying out the assembly in the presence of 0.1 to 20% by weight (based on the thermoplastic) of a bonding agent preferably consisting of polybutadiene or of butadiene-acrylonitrile rubber. GB Pat. No. 1,301,023 subsequently described a process consisting in (a) forming laminate comprising a sheet of thermoplastic material and at least one sheet of fibrous material impregnated with thermosetting resin, the sheet of thermoplastic material being at least as thick as the impregnated fibrous material, and (b) pressing the said laminate hot under a pressure of up to 35 bars and under time, temperature and pressure conditions which cause the thermosetting resin to cure without destroying the thermoplastic material.

GB Pat. A-2,087,307 describes a product comprising a substrate of thermoplastic material to which a decorative surface layer comprising a thermosetting material is bonded by means of a so-called "hot-melt" elastomer. This product may be obtaine by a process consisting:

either in manufacturing the thermoplastic substrate by continuous hot extrusion and, while it is still hot after the extrusion stage, placing it in contact with the face of the decorative surface layer which is coated with hot-melt elastomer, or in arranging at least one sheet of the decorative surface layer, coated with hot-melt elastomer, in a mould-forming part of a moulding or injection-moulding apparatus, introducing the thermoplastic material into the said mould at elevated temperature and, lastly, moulding the said material to form the substrate.

In this document, the layer comprising the thermosetting material is not fibre-reinforced. Lastly, GB Pat. B-2,043,532 describes a hot-mouldable laminate comprising at least one thermoplastic resin layer, at least one fibre-reinforced and cured thermosetting resin layer and at least one adhesive layer intermediate between the resin layers, the said adhesive layer comprising a thermoplastic resina and being able of existing in the molten state at a temperature below the moulding temperature, and the thickness of the thermoplastic resin layer being from 1 to 100 times the thickness of the reinforced and cured thermosetting resin layer.

The common feature of the various processes referred to above, whether they do or do not involve bonding fo thermoplastic and thermosetting layers by means of an adhesive layer, and whatever the respective thicknesses of the said layers, is the production of laminates by means of compression moulding techniques. In general, these techniques are suited to the manufacture of articles having a planar or virtually planar shape. On the contrary, they are poorly suited to the manufacture of articles having a complex, (convex or concave)shape, such as sanitaryware (baths, washbasins, sinks, and the like), motorcyclists' helmets, and the like. To manufacture such articles, particularly when the thermoplastic resin is polymethyl methyacrylate, use is generally made of the technique known as skelton forming, the latter being defined (according to A. F. Dorian, Six-Language Dictionary of Plastics and Rubber Technology (1965) page 535) as a process in which a plastic sheet is drawn partially into a vacuum chamber and then snapped back into a skelton mould in which the pressure is controlled by air admission.

In this context, there is already known, namely by FR Pat. A-2,325,505 a laminate material based on a skelton substrate of acrylic resin joined to a reinforced polyester, characterized by a sheet of polymethyl methacrylate to at least one face of which a polyester/reinforcing fibre and/or filler composite adheres directly. A material of this kind is manufactured at room temperature by the following series of operations:

spraying a thin layer of polyester resin onto a polymethyl methacrylate surface, simultaneous spraying of the polyester resin with its catalyst and accelerator, the fibre being used as reinforcement to form a first composite layer, as many successive sprayings, at time intervals of between 15 and 30 minuts, of additional layers of resin and of reinforcement as required to produce the desired thickness, each layer being carefully rolled, spraying of a final fibre layer not wetted by the polyester, and aging for about one week.

The process described by this document is performed entirely by hand and requires considerable manpower, working in a difficult environment; furthermore, quality of the articles produced is characterized by the random features of a nonautomated production. In particular, the time intervals which must elapse between two successive sprayings are the same whatever the surface of the layers.

FR Pat. A-2,243,580 also discloses a process for reinforcing, by means of a reinforced laminate resin, an article consisting substantially of a skelton-formed shell, characterized in that it consists in supporting one face of the shell by means of a cushion of elastically deformable material closely matching the said face, placing in the vicinity of the other face a mould member with a working surface elastically deformable or not and with a complementary shape, arranged so as to accommodate a reinforcing resin in the said free space, and in demoulding the shell thus reinforced. The process described by this document requires complex, and hence costly, skelton-forming moulds; in addition, the reinforced laminate resin must be injectable and can be located only in the concave part of the shell.

Commercial development of complex-shaped articles produced by skelton forming has hitherto suffered from limitations of a technical or economic (productivity) nature and even of quality, due to the manufacturing processes known until now. The purpose of the present invention is to solve the various problems connected with the inadequacies of the previous processes, particularly by permitting the manufacture of articles of complex shape from laminates comprising a layer of thermoplastic resin and a layer of reinforced thermosetting resin, at a low cost and ensuring a reproducible quality.

A first subject of the present invention consists therefore of an article produced from a laminate comprising at least one thermoplastic resin layer (A), at least one heat-cured fibre-reinforced resin layer (B) and at least one adhesive layer (C) intermediate between layers (A) and (B), characterized in that the said article is of complex shape and in that the ratio of the thickness of layer (B) to the thickness of layer (A) in the said article is at least equal to approximately 1.5. An article of complex shape means an article of nonplanar shape capable, for example, of having a space geometry comprising concave parts and/or convex parts, such as a shell shape. As indicated before, the usual articles corresponding to this definition are extremely numerous and relate to extremely varied fields of industry. It is essential that the ratio of the thicknesses (B)/(A) should be at least equal to approximately 1.5, and this ratio may easily reach a value up to approximately 10. In fact, articles in which this ratio is less than or equal to 1 are already well known and can be manufactured without difficulty by compression moulding processes, which is not the case with the articles according to the invention.

The nature of the adhesive in layer (C) is not immaterial for the quality of the articles according to the invention. The adhesive used must preferably provide good cohesion of the laminate, for example in tensile strength, and must, above all, be able of withstanding shearing and tearing forces due to the differential shrinkage of the thermoplastic resin on the fibrereinforced heat-cured resin. IT will therefore be advantageously selected from the so-called hot-melt adhesives. A "hot-melt adhesive" means a composition comprising (D) at least one thermoplastic polymer, (E) at least one tackifying resin and (F) at least one wax and/or one plasticizer for the polymer (D). As polymers (D) may be mentioned, in particular, polyvinyl acrylate, copolymers of ethylene with vinyl esters of carboxylic acid, copolymers of ethylene with alkyl acrylates or methacrylates, and terpolymers of ethylene with alkyl (meth)acrylates and maleic anhydride. As tackifying resins (E) may be mentioned, in particular, polyterpenes, rosins and their esters, polyvinyl ethers and petroleum resins. As plasticizers or waxes (F) may be mentioned, in particular, semialiphatic oils, aromatic, naphthenic or paraffinic petroleum oils, alkylbenzenes and esters derived from saturated organic acids, paraffins and microcrystalline waxy polymers. In particularly advantageous manner, such a hot-melt composition may additionally comprise atactic polypropylene of low molecular weight (between 1,000 and 7,000) or oxidized polypropylene of low molecular weight (as in U.S. Pat. No. 3,896,069).

In the articles according to the invention, a "thermoplastic resin" means a resin selected from:

(co)polymers of α-olefins containing from 2 to 8 carbon atoms, polymers and copolymers of aromatic vinyl monomers such as styrene and its derivatives, terpolymers produced by grafting (a) at least one aromatic vinyl monomer and (b) at least one unsaturated nitrile onto (c) at least one rubber, the said terpolymer being dispersed in a matrix of a copolymer comprising units derived from (d) at least one unsaturated nitrile and (e) at least one aromatic vinyl monomer (for proper understanding of this definition it should be specified that the aromatic vinyl monomer (a) and the aromatic vinyl monomer (e), which may be identical or different, are preferably selected from styrene and its derivatives such as methylstyrene, vinyltoluene and vinylnapthalene, while the unsaturated nitrile (b) and the unsaturated nitrile (d), which may be identical or different, are preferably acrylonitrile), cellulosic polymers, polymers and copolymers of vinyl chloride, and polymers and copolymers of methyl, methacrylate, comprising at least 85% by weight of this monomer and produced in the form of sheets by casting (bulk polymerization) or by the extrusion of bulk- or suspension-polymerized powders or granules.

The thermoplastic resin layer present in the articles according to the invention is preferably a thin layer such as a sheet with a thickness of between 0.3 and 1.5 mm, approximately. This sheet may be pigmented without any disadvantage, particularly for reasons of an aesthetic and decorative nature.

In the articles according to the invention, a "heat-cured resin" means a resin chosen from:

phenolic resins, epoxy resins and synthetic concretes produced from organic binders of an acrylic, polyester or polyurethane type, unsaturated polyesters, used either alone or as composites such as prepregs (widely referred to "sheet moulding compounds") or such a mixture with chopped glass fibres (widely referred to as "dough moulding compounds"), and polyvinyl esters such as, in particular, polyvinyl acrylate.

The fibres reinforcing the heat-cured resin may be, in particular, glass fibres.

A second subject of the present invention consists of a process for manufacturing an article such as described above, characterized in that, in a first step, a thermoplastic resin layer (A) is coated hot with at least one adhesive layer (C) and then, in a second step, the said adhesive-coated layer (A) is subjected to a skeleton forming operation (as defined above) using a complex-shaped layer (B) of fibre-reinforced heat-cured resin as a skelton mould and the skeleton forming conditions being such that the ratio of the thickness of layer (B) to the thickness of layer (A) in the complex shaped article produced is at least equal to about 1.5.

In the first step of the process according to the invention, the adhesive layer may be applied onto the thermoplastic resin layer by any appropriate means, particularly by coating or by spraying with a gun. "Coating" means the application of the adhesive in liquid form, i.e. preheated to a temperature of between 50° C. and 250° C., preferably between 150° C. and 205° C., by means of a system comprising, on the one hand, a melting unit (premelting, melt tank, pump) and, on the other hand, a unit consisting of two blades between which the liquefied adhesive is injected under pressure. By way of guidance, the melt rank pressure and the supply pressure to the blades may be up to 100 bars. Advantageously, in the first step of the process according to the invention, the hot-melt adhesive is applied onto the thermoplastic resin layer at a rate of 100 to 500 grams per $m^2$ of surface area of layer (A).

The skelton forming operation carried out in the second step of the process according to the invention is preferably performed at a temperature of between about 150° C. and 210° C. and/or with an absolute pressure of between about 15 and 200 millibars, being maintained in the vacuum chamber. The skeleton forming operation generally takes about 10 to 60 minutes and is followed by a cooling step, free and/or with ventilation, of variable duration, before the article can undergo control operations and then storage.

Due to drawing layer (A) into a vacuum chamber during the skelton forming operation, the thickness of this layer substantially decreases when carrying out the process according to the invention, while the thickness of the reinforced heat-cured layer (B) is substantially unchanged. The thickness of layer (A) is generally divided by a factor of about 3 when the process is applied; this is why care should be taken to submit to the process a layer (A) whose thicknesss is not more than double the thickness of layer (B).

The complex-shaped articles produced according to the process of the invention simultaneously have a remarkable cohesion, particularly in tensile strength, and a satisfactory surface appearance. The present invention may therefore be advantageously applied to the manufacture of baths made of polymethyl methacrylate reinforced with a strengthended polyester resin (example of an article of concave shape) as well as to the manufacture of motor vehicle bodywork components (example of an article of convey shape).

The nonlimiting examples which follow are intended to illustrate the present invention.

The standards or tests used to define the characteristics of the materials produced are:

visual inspection: test consisting in noting the optical appearance fo the articles produced after skelton forming; it consists in checking the retention of the initial optical properties of the thermoplastic sheet;

ball impact: a test consisting in allowing a spherical ball 37 mm in diameter, weighing 200 grams, to fall from a height of one metre without causing fracture of the thermoplastic layer. This test is carried out according to the European Standardization Commission's draft standard TC 86;

adhesion: this test is carried out according to ASTM standard C 297 or ISO standard 527;

resistance to temperature variations: a test consisting in a cyclic alternating succession of hot water (at 90° C.) and cold water (at 12° C.) and in checking cohesion of the laminate and retention of the general properties. This test is performed according to the European Standardization Commission's draft standard TC 86 for acrylic baths.

EXAMPLE qb 1

A 3-mm thick sheet of polymethyl methacrylate marketed by the Applicant Company under the trademark Altuglas (sanitary quality) is coated with a hot-melt adhesive marketed by Eastman Kodak under the trademark Eastabond A 167 S by means of a Fraco coating machine equipped with blades, under the following conditions;

adhesive tank temperatures: 185° C.
melt tank pressure: 40 bars
blade supply pressure: 20 bars
shim wideth between blades: 5/10 mm

EXAMPLE 2

The adhesive-coated sheet of Example 1 is skelton-formed onto an undepolished strengthened preform prepared by pressing polyester of trademark Norsopreg marketed by CdF Chimie Resines. The skeleton forming operation is carried out with the aid of a rigid jig holding the preform, under the following conditions:

heating time: 30 minutes in a ventialated oven for the adhesive-coated sheet and the preform;
heating temperature: 190° C.

After skeleton forming, the resultant laminate is held for 30 minutes under a vacuum of 720 mm of mercury (including 15 minutes' cooling, followed by 15 minutes with ventilation).

The following results are obtained:

visual inspection: excellent;
ball impact: excellent;
adhesion: 1.5 MPa;
resistance to temperature variations: excellent.

I claim:

1. A process for the manufacture of a complex shaped article comprising the steps of:
   (a) hot coating a thermoplastic resin layer (A) with at least one adhesive layer (C), and
   (b) subjecting the adhesive-coated layer (A) to a skeleton forming operation in a vacuum chamber using a complex-shaped layer (B) of fibre-reinforced heat-cured resin as a skelton mould, the skeleton forming conditions being such that the ratio of the thickness of layer (B) to the thickness of layer (A) in the complex-shaped article produced is at least equal to 1.5.

2. An article produced from a laminate comprising:
   at least one thermoplastic resin layer (A),
   at least one fibre-reinforced heat-cured resin layer (B), and
   at least one adhesive layer (C) intermediate between layers (A) and (B),
   the article being of complex shape and having a ratio of the thickness of layer (B) to the thickness of layer (A) at least equal to 1.5 wherein said article is produced according to the process set forth in claim 1.

3. Article according to claim 2, wherein the ratio of the thickness of layer (B) to the thickness of layer (A) in the article does not exceed 10.

4. Article according to, claim 2, wherein the adhesive in layer (C) is a hot-melt adhesive.

5. Article according to claim 4, wherein the adhesive in layer (C) is a composition comprising:
   (D) at least one thermoplastic polymer,
   (E) at least one tackifying resin and
   (F) at least one wax and/or one plasticizer for the polymer (D).

6. Article according to claim 5, wherein the composition additionally comprises atactic polypropylene of low molecular weight.

7. Article according to claim 2, wherein layer (A) is a sheet with a thickness of between 0.3 and 1.5 mm.

8. Article according to claim 2, wherein the thermoplastic resin of layer (A) is polymethyl methacrylate.

9. Article according to either of claims 2 and 3, wherein the adhesive in layer (C) ensures the cohesion of the laminate while opposing the shearing and tearing forces due to the differential shrinkage of the thermoplastic resin on the fibre-reinforced heat-cured resin.

10. Process according to claim 1, wherein layer (C) is applied onto layer (A) by coating with an adhesive preheated to a temperature of between 150° C. and 205° C.

11. Process according to either claims 1 and 10, wherein the skeleton forming operation in the second step is performed at a temperature of between 105° C. and 210° C.

12. Process according to claim 1, wherein during the skeleton forming operation an absolute pressure of between 15 and 200 millibars is maintained in the vacuum chamber.

13. Process according to claim 1, wherein the thickness of the layer (A) which is subjected to skeleton forming is not more than double the thickness of layer (B).

* * * * *

UNITED STATES PATENT AND TRADEMARK OFFICE
CERTIFICATE OF CORRECTION

PATENT NO.  : 4,956,224

DATED       : September 11, 1990

INVENTOR(S) : Jean-Paul Leca

It is certified that error appears in the above-identified patent and that said Letters Patent is hereby corrected as shown below:

Column 3, line 27, delete "thermoplastic" and insert in place thereof --thermoelastic--;

Column 6, line 36, delete "thermoplastic" and insert in place thereof --thermoelastic--.

Signed and Sealed this

Fourteenth Day of January, 1992

Attest:

HARRY F. MANBECK, JR.

*Attesting Officer*   *Commissioner of Patents and Trademarks*